Dec. 9, 1924.

A. J. PETRIE 1,518,220

SELF LUBRICATING BEARING

Filed Nov. 28, 1921

INVENTOR.
August J. Petrie
BY
Erwin Wheeler & Woodard
ATTORNEYS.

Patented Dec. 9, 1924.

1,518,220

UNITED STATES PATENT OFFICE.

AUGUST J. PETRIE, OF WEST ALLIS, WISCONSIN, ASSIGNOR TO MILWAUKEE STAMPING COMPANY, OF WEST ALLIS, WISCONSIN, A CORPORATION OF WISCONSIN.

SELF-LUBRICATING BEARING.

Application filed November 28, 1921. Serial No. 518,217.

*To all whom it may concern:*

Be it known that I, AUGUST J. PETRIE, a citizen of the United States, residing at West Allis, county of Milwaukee, and State of Wisconsin, have invented new and useful Improvements in Self-Lubricating Bearings, of which the following is a specification.

This invention relates to improvements in self lubricating bearings for rods and shafts such, for example, as the spring actuated rods controlling the movement of double acting swinging doors and other devices in which similar conditions of intermittent or occasional use prevail, and in which extreme accuracy and extended continuous supporting contact with the shaft or rod is not required.

The object of this invention is to provide a simple, inexpensive and efficient bearing for use under the above described conditions, and to also provide means whereby the bearing will be adequately lubricated for a considerable period from a supply inserted at the factory; the lubrication being most effective at the outset when most needed.

More particularly stated the object is to provide a form of bearing which can be stamped from sheet metal in two identical parts which may then be assembled upon the rod or shaft in opposed relation, and anchored together and to a supporting frame in the single operation of assembly, the form of the stampings being such that, when assembled, they form a lubricant receiving cavity thru which the rod or shaft passes, and also form a pair of annular rod supporting sleeves or collars at the respective ends of the cavity.

In the drawings:—

Like parts are identified by the same reference characters thruout both views.

Figure 1:
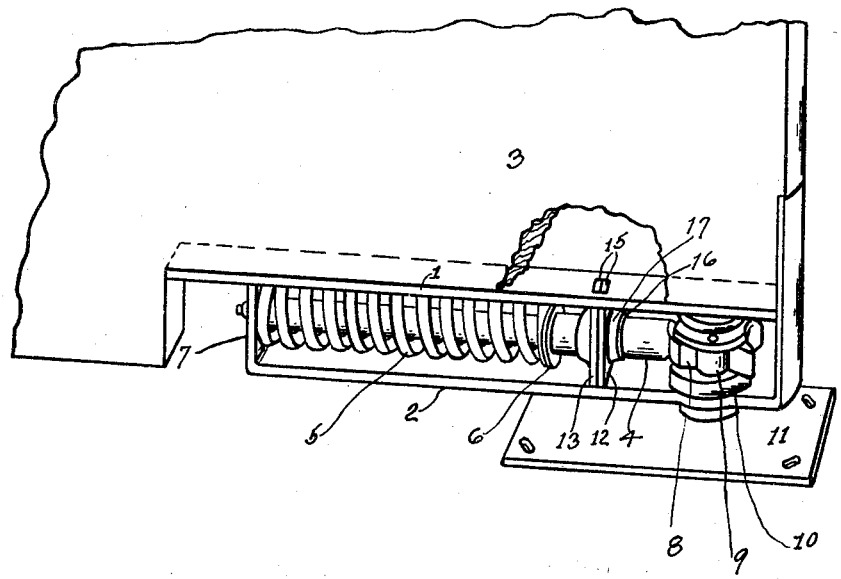
Figure 1 is a perspective view of a door hinge provided with a bearing embodying our invention, a portion of the door being illustrated.
Figure 2:
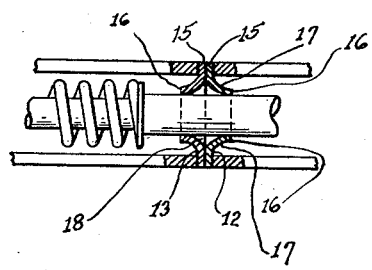
Figure 2 is a detail view showing the bearing and a portion of the frame in vertical section, and in assembled relation to fragments of the associated rod and its actuating spring.

The frame plates 1 and 2 are fitted to a recess in the bottom of the door 3 in the ordinary manner. The door hinge, with the exception of the bearing hereinafter described, may also be of ordinary construction, including the spring actuated rod 4, compression spring 5 seated between the collar 6 and abutment 7. The cross head 8 on the rod 4 in pressure relation to the abutments 9 on a bracket 10 carried by the base plate 11 all constitute parts of an ordinary hinge mechanism for double acting or reversely swinging doors, and therefore no further description of these parts is deemed necessary.

The improved bearing is formed of two generally rectangular sheet metal plates 12 and 13 having abutting flat marginal portions and provided at top and bottom with projecting ears 15 which are firmly engaged in suitable apertures formed in the top and bottom frame members 1 and 2 respectively, and preferably riveted therein whereby the plates are securely anchored in position.

Each plate carries an integrally offset bearing sleeve or annulus 16, connected with the flat vertical portions by flaring or bell shaped portions 17 forming the walls of a grease cavity 18. The rod 3 extends thru the sleeves and thru the cavity 17, and the cavity 18 is filled with a normally solid lubricant, such as solid grease or graphite, which under the conditions of use will reach the rod in minute quantities from time to time after the initially contacting portion has been worn away. In fact, when this improved bearing is embodied in a door hinge dependence for lubrication will eventually be had largely upon change of temperature and the shocks to which such doors are usually subjected. But free lubrication is provided initially when it is most needed.

The improved bearing may be manufactured very cheaply and expeditiously inasmuch as the plates may be cut from sheet metal, punched centrally or otherwise provided with apertures of somewhat less diameter than the rod 3, and then shaped in a drawing press to the form above described. Both halves of the bearing may be exactly alike and therefore both may be made by the same blanking and drawing presses. Each may have its bell shaped portion 17, or half cavity, filled with lubricant before complete assembly, the cavity being permanently closed when the ears 15 are anchored in the holes prepared for them in the plates 1 and 2.

We claim:—

1. A double acting door hinge provided with a longitudinally movable spring actuated rod, in combination with a mounting having upper and lower frame members, and a bearing composed of bell shaped portions embracing the rod with their flaring margins abutting and extended in the form of vertically disposed flat plates in interlocking relation to the frame members, said bell shaped portions being filled with a normally solid lubricant.

2. In a device of the character described, the combinations with a frame comprising spaced members each having corresponding apertures, of an axially movable rod disposed between said members, and a bearing for said rod, said bearing comprising a pair of plates each having a hub portion disposed about said rod and provided with projecting ears disposed within said apertures, whereby to confine said bearing against movement relatively of said frame.

3. In a device of the character described, the combination with a frame comprising a pair of spaced members, each provided with an aperture corresponding to the aperture in the other of said members, of an axially movable rod disposed between said members, and a bearing for said rod, said bearing comprising a hub portion for said rod and a radially extending portion provided with projecting lugs seated within such apertures.

AUG. J. PETRIE.